US012222862B2

(12) United States Patent
Shveidel et al.

(10) Patent No.: US 12,222,862 B2
(45) Date of Patent: Feb. 11, 2025

(54) CACHING TECHNIQUES USING A TWO-LEVEL READ CACHE

(71) Applicant: Dell Products L.P., Hopkinton, MA (US)

(72) Inventors: Vladimir Shveidel, Pardes-Hana (IL); Vamsi K. Vankamamidi, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/071,798

(22) Filed: Nov. 30, 2022

(65) Prior Publication Data

US 2024/0176741 A1    May 30, 2024

(51) Int. Cl.
*G06F 12/0831*    (2016.01)
*G06F 12/0882*    (2016.01)
*G06F 12/0891*    (2016.01)

(52) U.S. Cl.
CPC ...... *G06F 12/0835* (2013.01); *G06F 12/0882* (2013.01); *G06F 12/0891* (2013.01)

(58) Field of Classification Search
CPC ............ G06F 12/0835; G06F 12/0882; G06F 12/0891
See application file for complete search history.

(56) References Cited

U.S. PATENT DOCUMENTS

| 5,704,060 A | * | 12/1997 | Del Monte | ............. H03M 7/30 704/7 |
| 2013/0124794 A1 | * | 5/2013 | Bux | .................... G06F 12/0866 711/103 |
| 2019/0042134 A1 | * | 2/2019 | Nishizono | ............. G06F 3/0689 |

OTHER PUBLICATIONS

SNIA Dictionary definition of a Cache—screenshot taken by archive. org on Oct. 18, 2019. (Year: 2019).*
A definion of indirect pointer taken from web.cs.ucla.edu/classes/winter2/cs11 class notes https://web.archive.org/web/20181013021044/https://web.cs.ucla.edu/classes/winter12/cs111/scribe/11a/ (Year: 2018).*
U.S. Appl. No. 17/715,459, filed Apr. 7, 2022, entitled Caching Techniques, to Ashok Tamilarasan, et al.

* cited by examiner

*Primary Examiner* — Michael Krofcheck
*Assistant Examiner* — Janice M. Girouard
(74) *Attorney, Agent, or Firm* — Muirhead and Saturnelli, LLC

(57) ABSTRACT

Techniques for processing a read I/O operation that reads first content stored at a target logical address can include: determining, using the target logical address as a first key to index into a first cache, whether the first cache includes a first cache entry caching first metadata used to access a first physical storage location including the first content stored at the target logical address; responsive to determining the first cache includes the first cache entry, determining, using the first metadata as a second key to index into a second cache, whether the second cache includes a second cache entry caching the first content stored at the target logical address; and responsive to determining the second cache includes the second entry, returning the first content from the second entry of the second cache in response to the read I/O operation.

19 Claims, 12 Drawing Sheets

CACHING TECHNIQUES USING A TWO-LEVEL READ CACHE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. Processing can include receiving a read I/O operation that reads first content stored at a target logical address; determining, using the target logical address as a first key to index into a first cache, whether the first cache includes a first cache entry caching first metadata used to access a first physical storage location including the first content stored at the target logical address; responsive to determining the first cache includes the first cache entry, determining, using the first metadata as a second key to index into a second cache, whether the second cache includes a second cache entry caching the first content stored at the target logical address; and responsive to determining the second cache includes the second entry, returning the first content from the second entry of the second cache in response to the read I/O operation.

In at least one embodiment, the first metadata used as the second key to index into the second cache can be included in mapping information which maps the target logical address to the first physical storage location including the first content. The first physical storage location can be included in a non-volatile storage device providing backend storage in a data storage system which receives the read I/O operation and which performs the method responsive to receiving the read I/O operation. The mapping information can include a plurality of metadata pages. The plurality of metadata pages can include a first metadata page comprising a plurality of metadata entries including a first metadata entry, and wherein the first metadata, which used as the second key to index into the second cache, can be a reference to, pointer to, or address of, the first metadata entry in the first metadata page.

In at least one embodiment, the second cache can include a plurality of data portions stored in a plurality of entries of the second cache. The plurality of entries and the plurality of data portions can be accessed using a plurality of keys associated with the plurality of entries. Each of the plurality of data portions stored in the second cache can be a single unique instance so that the second cache does not include any duplicate data portions. Each of the plurality of data portions stored in the second cache can be stored in an uncompressed form.

In at least one embodiment, processing can include: responsive to determining the first cache does not include the first cache entry, performing first processing including: reading mapping information for the target logical address to obtain the first metadata of the mapping information, wherein the mapping information maps the target logical address to the first physical storage location including the first content, and wherein the first metadata is a reference used to access the first physical storage location and retrieve the first content; determining, using the first metadata obtained from said reading, whether the second cache includes the second cache entry caching the first content stored at the target logical address, wherein the first metadata obtained from said reading is used as the second key to index into the second cache; and responsive to determining, using the first metadata obtained from said reading, that the second cache includes the second entry, returning the first content from the second entry of the second cache in response to the read I/O operation. Reading can retrieve at least some of the mapping information from non-volatile storage, and wherein the mapping information can include a plurality of metadata pages. Processing can include adding the first cache entry, which is associated with the target logical address as the first key, to the first cache.

In at least one embodiment, the first processing can further include, responsive to determining, using the first metadata obtained from said reading, that the second cache does not include the second entry, performing second processing. The second processing can include: retrieving, from non-volatile storage, a first metadata page including a plurality of metadata entries comprising a first metadata entry, wherein the first metadata is a reference to, pointer to, or an address of, the first metadata entry, wherein the first metadata entry includes a field denoting the first physical storage location of the first content; retrieving, from the non-volatile storage using the field of the first metadata entry, the first content from the first physical storage location included in the non-volatile storage; and returning the first content retrieved from the non-volatile storage in response to the read I/O operation. The non-volatile storage can provide back-end physical storage in a data storage system. Processing can include adding the second entry, which is associated with the first metadata as the second key, to the second cache.

In at least one embodiment, processing can include: determining whether a log of recorded write operations includes a first record of a first write operation that writes to the target logical address, wherein the first record identifies first write data written by the first write operation; responsive to determining the log includes the first record of the first write operation that writes to the target logical address, returning the first write data as the first content stored at the target logical address; and responsive to determining the log does not include the first record of the first write operation that writes to the target logical address, performing said determining whether the first cache includes the first cache entry. A third cache can include the log of recorded write operations, and wherein each of the recorded write operations of the log stored in the third cache can be indexed using a corresponding logical address written to by said each recorded write operation. The third cache may only cache recorded write operations which have not yet been flushed from the log.

In at least one embodiment, the first cache can include another cache entry storing the first metadata associated with a second logical address which is different than the target logical address. Processing can include performing data deduplication processing which determines that the first content is duplicate content stored at both the target logical address and the second logical address, wherein first mapping information maps the target logical address to the first physical storage location, and wherein second mapping information maps the second logical address to the first physical storage location.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
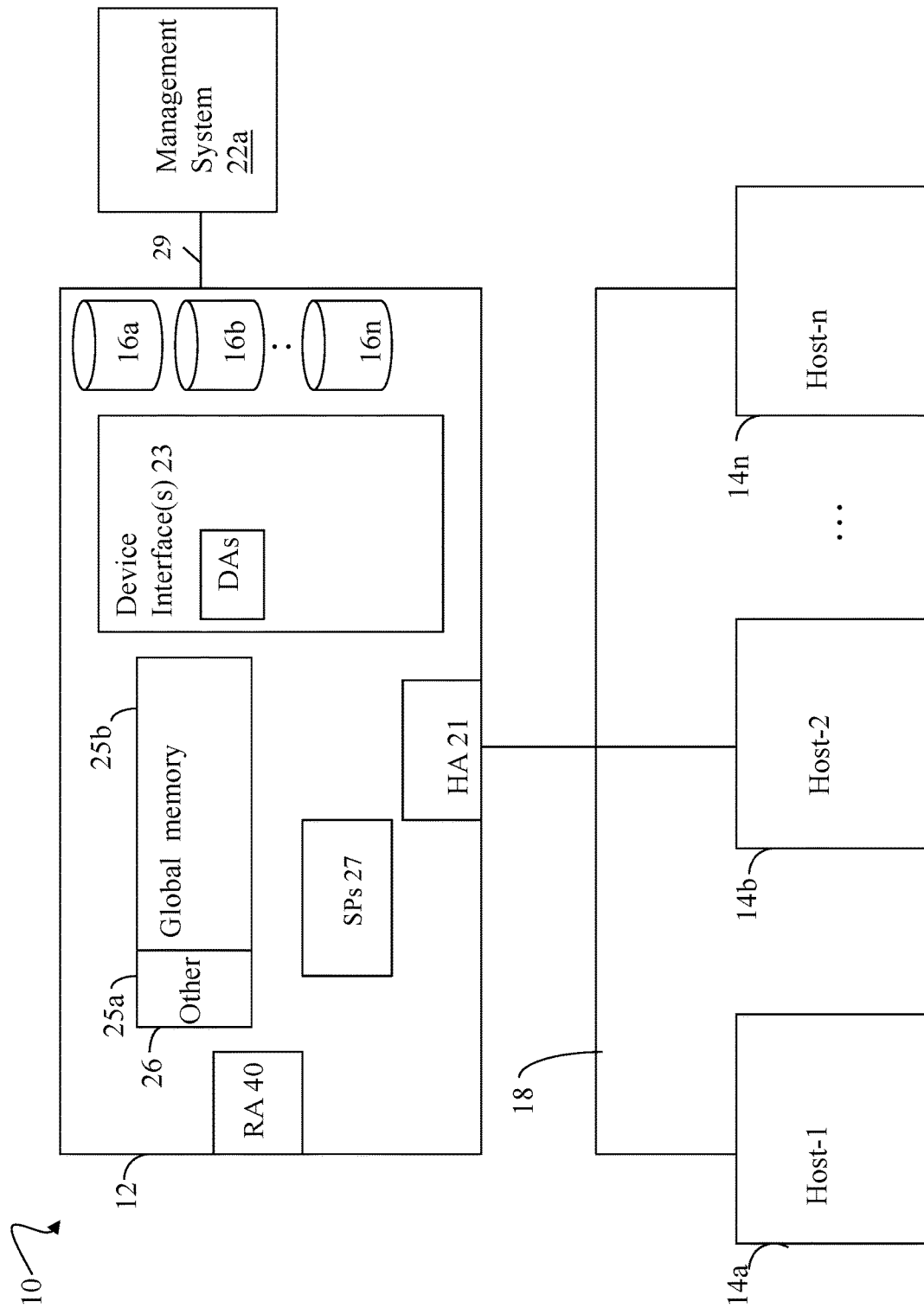
FIG. 1 is an example of components that may be included in a system in accordance with the techniques of the present disclosure.

Existing systems, such as data storage systems, can maintain and utilize a data cache to store frequently accessed pages of data. The data cache can be, for example, a form of fast volatile memory such as a volatile form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term backend (BE) non-volatile storage. A cache miss as compared to a cache hit results in an I/O performance penalty and increased I/O latency in order to service the read I/O and return the requested read data to the requester. Thus, use of the data cache can provide for read cache hits and optimized performance such as by providing for improved I/O latency and improved utilization of system resources. Generally, the data cache can be characterized as a critical and expensive resource which can have a limited size or capacity. Accordingly, it is important for systems to utilize the data cache, and more generally cache storage, efficiently to provide for optimal performance.

Existing data storage systems can provide various data storage services such as data deduplication. With data deduplication, different techniques can be utilized to identify duplicate stored data or content. For example, three write I/Os can write the same content C1, respectively, to three different logical addresses. Each of the logical addresses can be a different logical address and can be expressed as a user volume or logical device and a logical offset within the user volume or logical device. For example, the content C1 can be written to the 3 different logical addresses LA1, LA2 and LA3. With deduplication, only a single unique instance of the duplicate content C1 is stored on the BE non-volatile storage and each of the 3 logical addresses LA1, LA2 and LA3 can reference the same physical address on the BE non-volatile storage where the content C1 is stored. In this manner, the amount or capacity of BE non-volatile storage can be reduced and used more efficiently to store content such as user data. The data cache used in such a system performing deduplication can be indexed or organized using logical addresses as the key. In this manner, content such as user data which is stored in the cache can be accessed by logical address. Since such a data cache is organized by logical address, the cache can contain several instances of the same data page or content. For example with reference to LA1, LA2 and LA3 noted above all storing the same content C1, the data cache can include 3 entries, one for each of the 3 logical addresses, where each such cache entry stores the same content C1. The foregoing can be characterized as an inefficient use of cache, such as a data cache used to store read data, in systems providing data deduplication.

In some scenarios, a large amount of data cache can be used to inefficiently store duplicate data pages or content thereby resulting in an undesirable performance hit and increased I/O latency. One such scenario is a boot storm scenario where, for example, there can be many identical deduplicated virtual machines (VMs) booting such as on a host. There can be a large amount of duplicate content requested or read in connection with booting the VMs. The duplicate content can be stored at many different logical addresses. For example, an entire data cache can contain 100 unique data pages that are duplicated for thousands of logical addresses. In this manner, the cache can include many duplicate copies of a unique data page, where each copy of the same data page which is referenced by a different logical address is stored in a different cache entry.

Accordingly, described in the present disclosure are techniques that provide for improved and efficient use of the cache, such as used to store read data. The techniques can be used to eliminate caching duplicate content which can be referenced by multiple logical addresses such as generally illustrated and noted above for the boot storm scenario.

In at least one embodiment, metadata (MD) pages or mapping information can be used to map a logical address of user data (UD) to a physical address or BE storage location of the content stored at the logical address. Generally, the MD pages can be used in connection with chains of mapping information that map logical addresses to storage locations including content stored at the logical addresses. In at least one embodiment, the MD pages of the mapping information can map a logical address LA1 to a corresponding BE storage location, P1, including the content C1 stored at LA1. The MD pages or mapping information can be characterized as a chain forming an access sequence including a top MD page, a mid MD page, a leaf MD page, and a VLB (virtualization layer block), where an entry of the VLB points to or references the storage location P1 containing the stored content C1 of the logical address LA1 (e.g., the entry of the VLB can include the address of P1). In connection with duplicated content in a system performing deduplication where there are two logical addresses LA1 and LA2 both storing the same content C1, two different chains of mapping information can reference or point to the same storage location P1.

When a read cache miss occurs in connection with requested read data not in cache, the requested read data can be read from the BE storage location. For example, a read cache miss can occur when a read I/O requests to read content stored at a logical address such as LA1 and/or LA2.

In at least one system without using the techniques of the present disclosure, such a read cache miss can always include loading the mapping information pages, such as necessary MD top, mid, leaf and VLB pages discussed in more detail below, into the cache if any such pages are not already in cache, and traversing the sequence or chain of such pages to access the requested content C1 from the BE storage location P1.

In at least one embodiment, a user data (UD) or client logical address, which can be the target logical address of a client I/O operation such as a read or write operation, can be uniquely identified using the volume or LUN ID (identifier) in combination with the LBA or offset of the logical address. In at least one embodiment, the logical address denoted by the combination of the volume or LUN ID and the LBA or offset can be mapped to, and represented using, a ULXA value, where the value of the ULXA can be generally characterized as an identifier uniquely identifying a particular user data (UD) page within a data storage system, and if multiple storage systems are included in a cluster, uniquely identified within the cluster of data storage systems. Thus, the ULXA can be a value that denotes or represents the logical address such as the UD logical address. From a given ULXA value, the uniquely associated LUN ID and LBA denoting a logical address can be mapped or determined. Also, given a particular LUN ID and LBA (e.g., logical address), the unique corresponding ULXA value can be mapped or determined. In at least one embodiment in accordance with the techniques of the present disclosure, the ULXA value and/or its corresponding logical address can be used as an index into the ULXA cache. In the following paragraphs, reference can be made to accessing or indexing into the ULXA cache using logical addresses. Alternatively, corresponding ULXA values can also be utilized.

In at least one embodiment in accordance with the techniques of the present disclosure in which deduplication is performed, a two-level caching technique can be utilized to read requested data of a logical address, where such data or content is stored at a BE storage location. The two-level caching technique can be utilized to service a read cache miss such as when a read cache miss occurs in connection with a read I/O operation that reads content from LA1 or LA2 noted above. The two-level caching technique can also be used to read C1 which can be stored in cache thereby resulting in a read cache hit. In at least one embodiment, the two-level caching technique can utilize a first cache, sometimes referred to as the ULXA or logical address cache, and a second cache, sometimes referred to as the VLB cache. The ULXA cache can map logical addresses to corresponding VLB entries. The VLB cache can map VLB entries to associated content or data stored in the VLB cache on the data storage system. In particular, the ULXA cache can map a logical address, such as LA1, to an address A1 of a VLB entry, where the VLB entry can be used to access the content or data C1 stored at the logical address LA. The address A1 can generally be a reference or pointer to the VLB entry. The address A1, as obtained from the ULXA cache entry for LA1, can then be used to index into the VLB cache and obtain, from the VLB cache, the content C1 stored at the logical address LA1. Thus, servicing a read cache miss for LA1 can include performing a first cache lookup in the ULXA cache using the logical address LA1 as an index into the first cache to obtain the cached address A1 of the VLB entry; and then performing a second cache lookup in the VLB cache using A1 as an index into the VLB cache to obtain the content C1 as stored in the VLB cache.

In such an embodiment in accordance with the techniques of the present disclosure, the two-level caching technique or two-level lookup can include using the logical address LA1 as an index into the ULXA cache to thereby query or search the ULXA cache for A1 denoting a corresponding pointer to, or an address of, a VLB entry in the ULXA cache for the logical address LA1. Subsequently, the address A1 of the VLB entry can be used as another key to index or search the VLB cache for the content or data C1, whereby C1 is stored at the logical address LA1.

In such an embodiment in accordance with the techniques of the present disclosure, the ULXA cache and the VLB cache can be utilized to service read cache misses. In such an embodiment, it is possible to experience a cache miss in connection with the ULXA cache or VLB cache. In the case where there is a ULXA cache miss for LA1, the regular default mapping information resolution using the chain of pages can be utilized to obtain the address A1 of the VLB entry associated with the content C1 stored at LA1. Subsequently, the address A1 of the VLB entry can be used to index into the VLB cache and obtain C1 stored in the VLB cache.

If there is a VLB cache miss in connection with the address A1 of the VLB entry E1, the VLB page corresponding to A1 (e.g., where the VLB page includes the VLB entry E1) can be read from the BE storage into cache. Subsequently, P1 can be accessed on the BE storage using E1 which is now stored in cache. In at least one embodiment, the VLB entry E1 can include P1, where P1 denotes a reference, pointer or address of a BE storage location storing the desired content CL.

In at least one embodiment, a hash value HV can be calculated from the ULXA value (e.g., using the LUN or volume ID and page offset within the LUN or volume) using a hash function, where the hash value HV can be used as a key to index into the ULXA cache.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
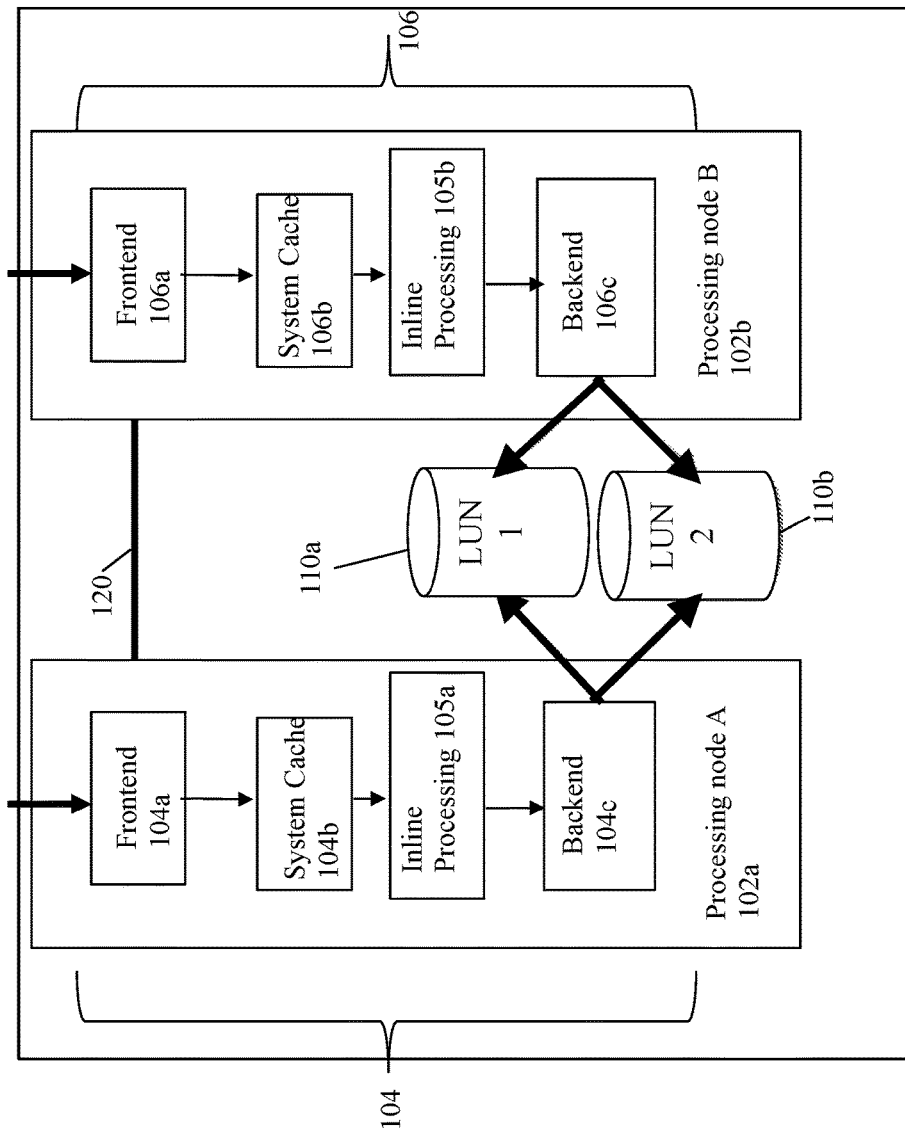
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102*a* is the peer node of the node B 102*b*, and the node B 102*b* is the peer node of the node A 102*a*.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
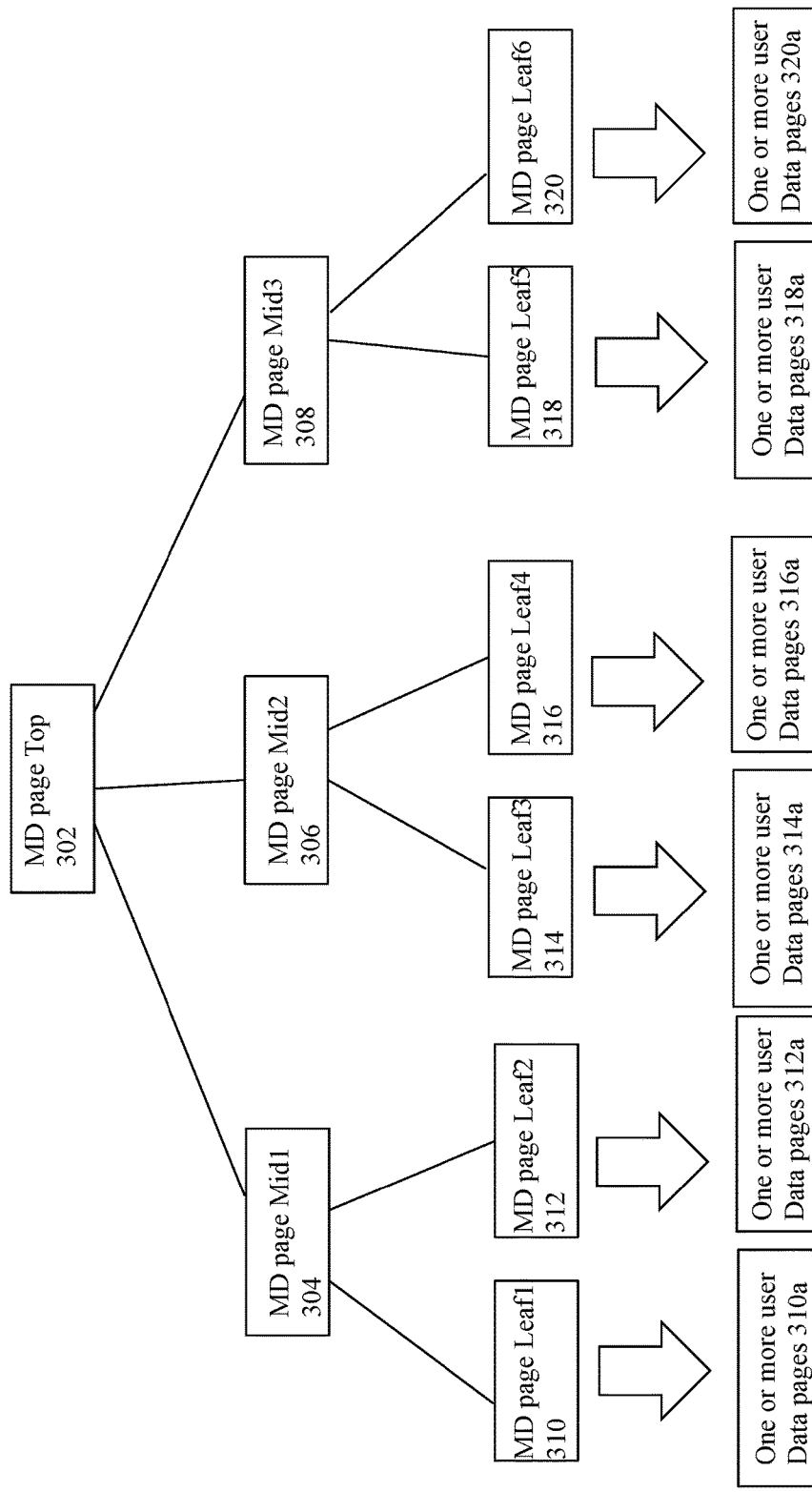
FIGS. 3, 4, 5, and 6 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
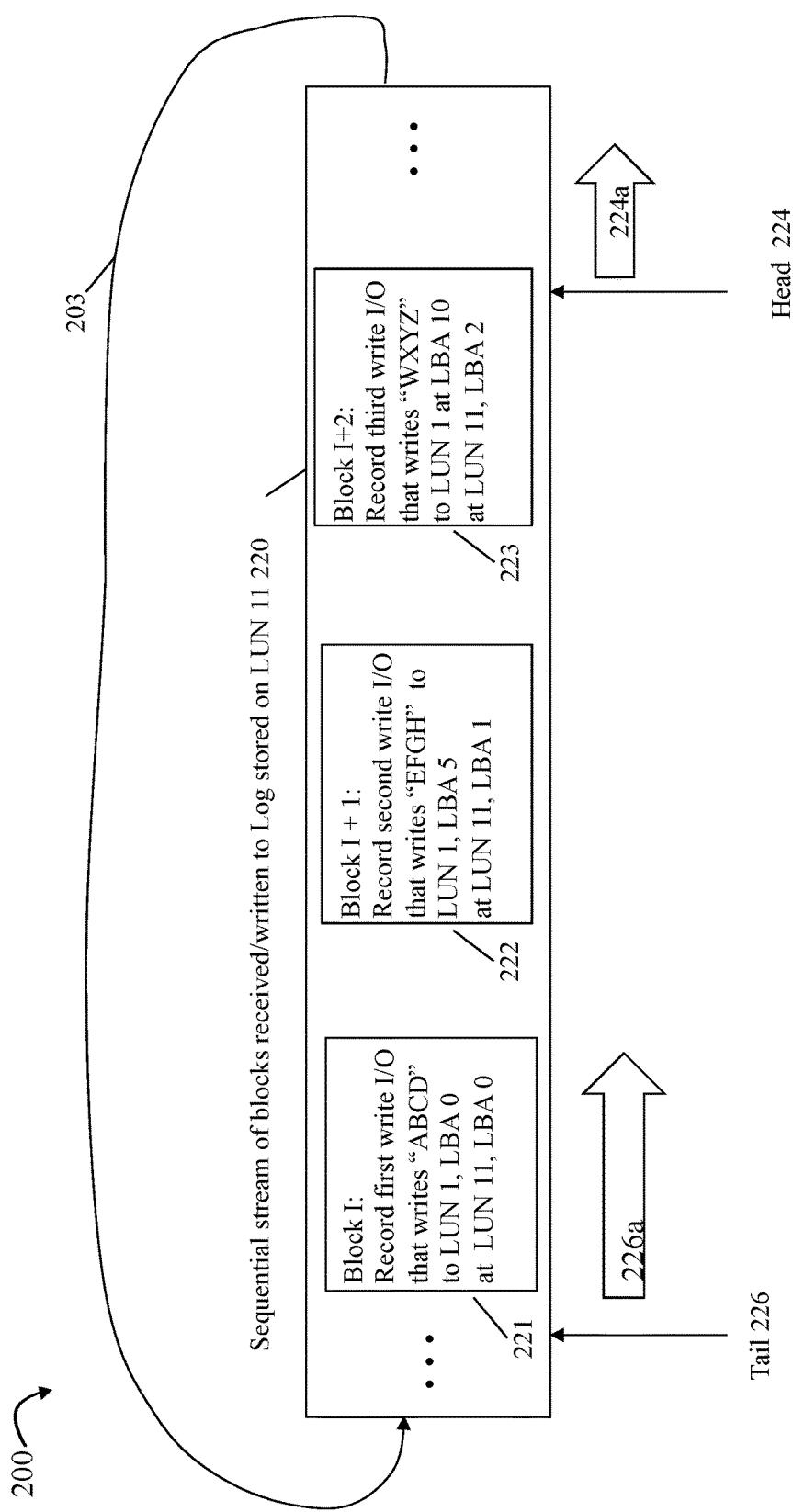
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
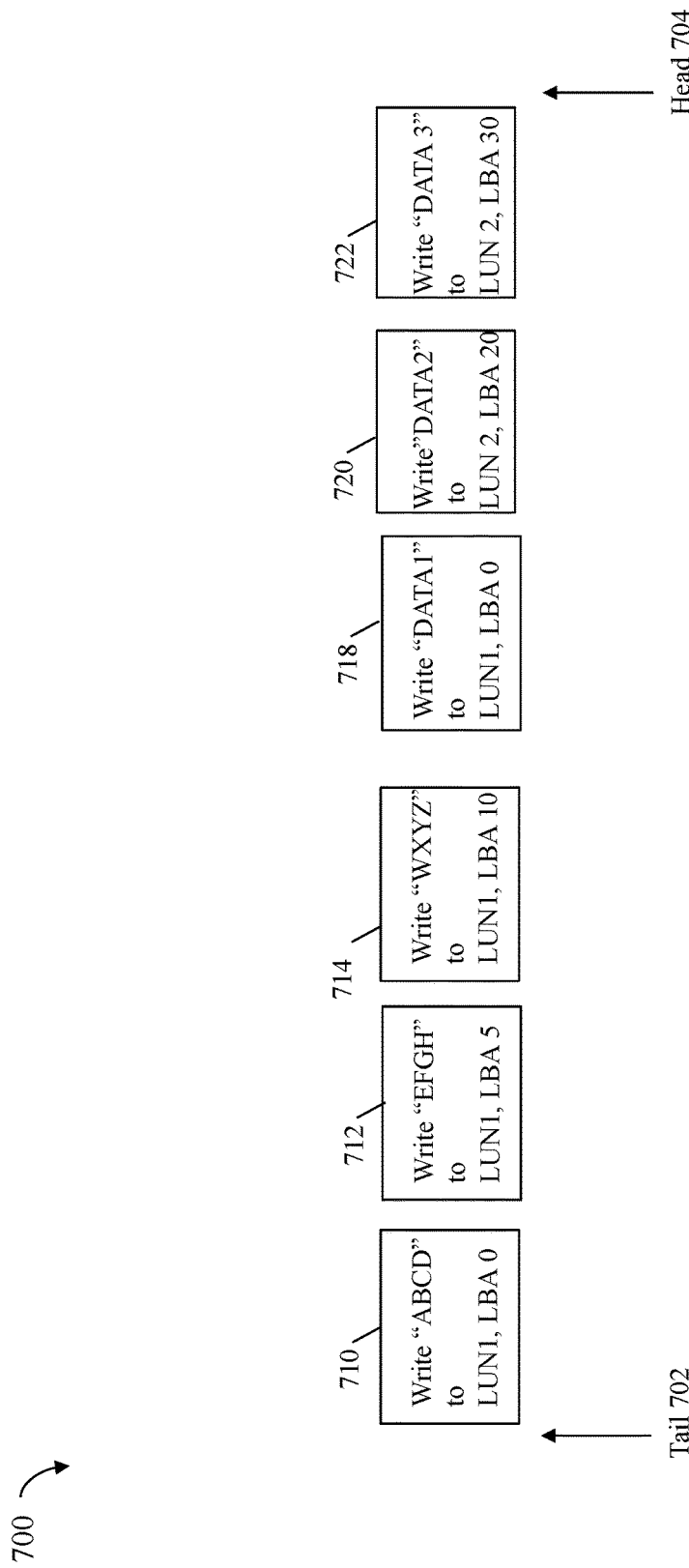

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
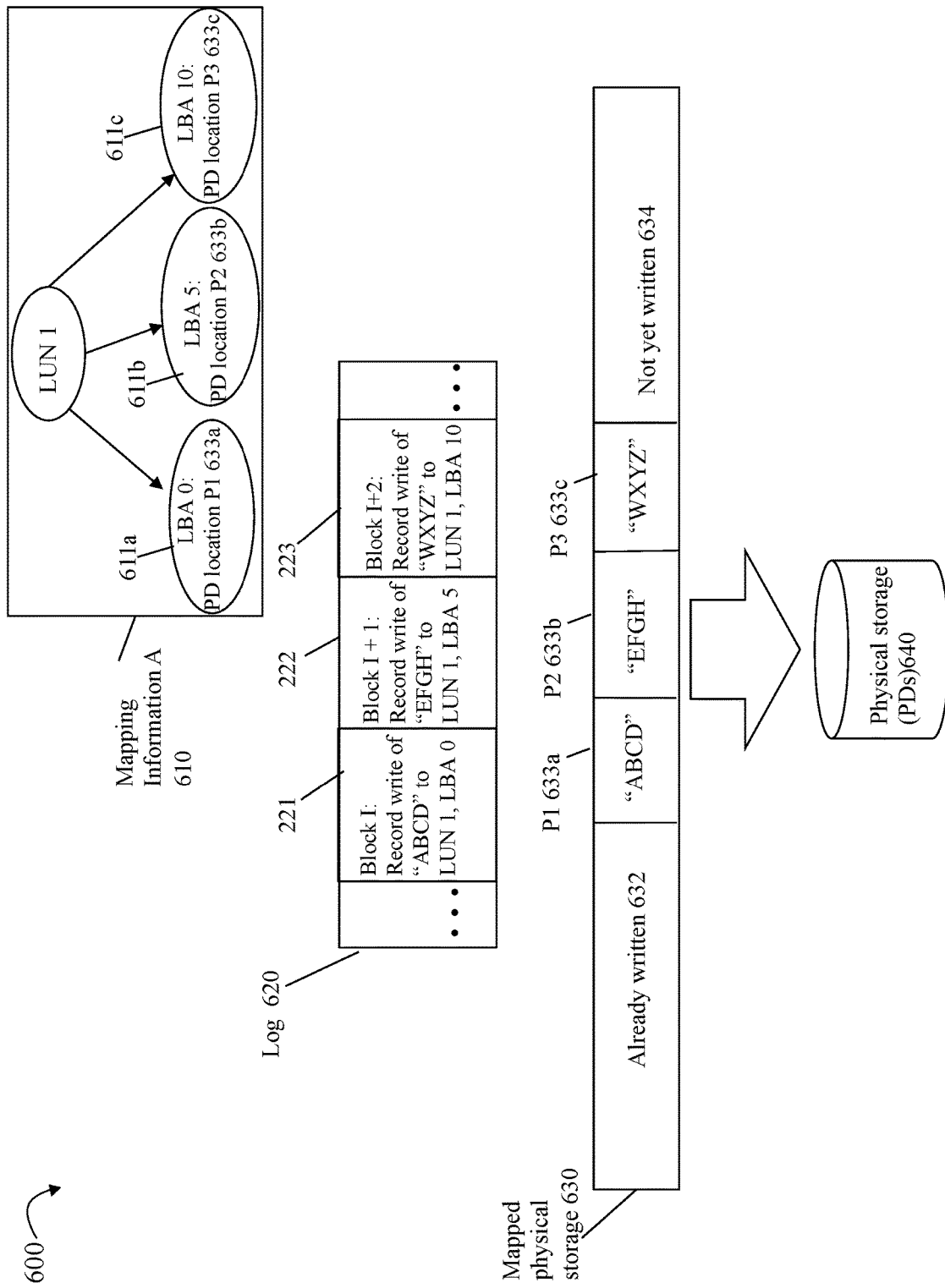

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
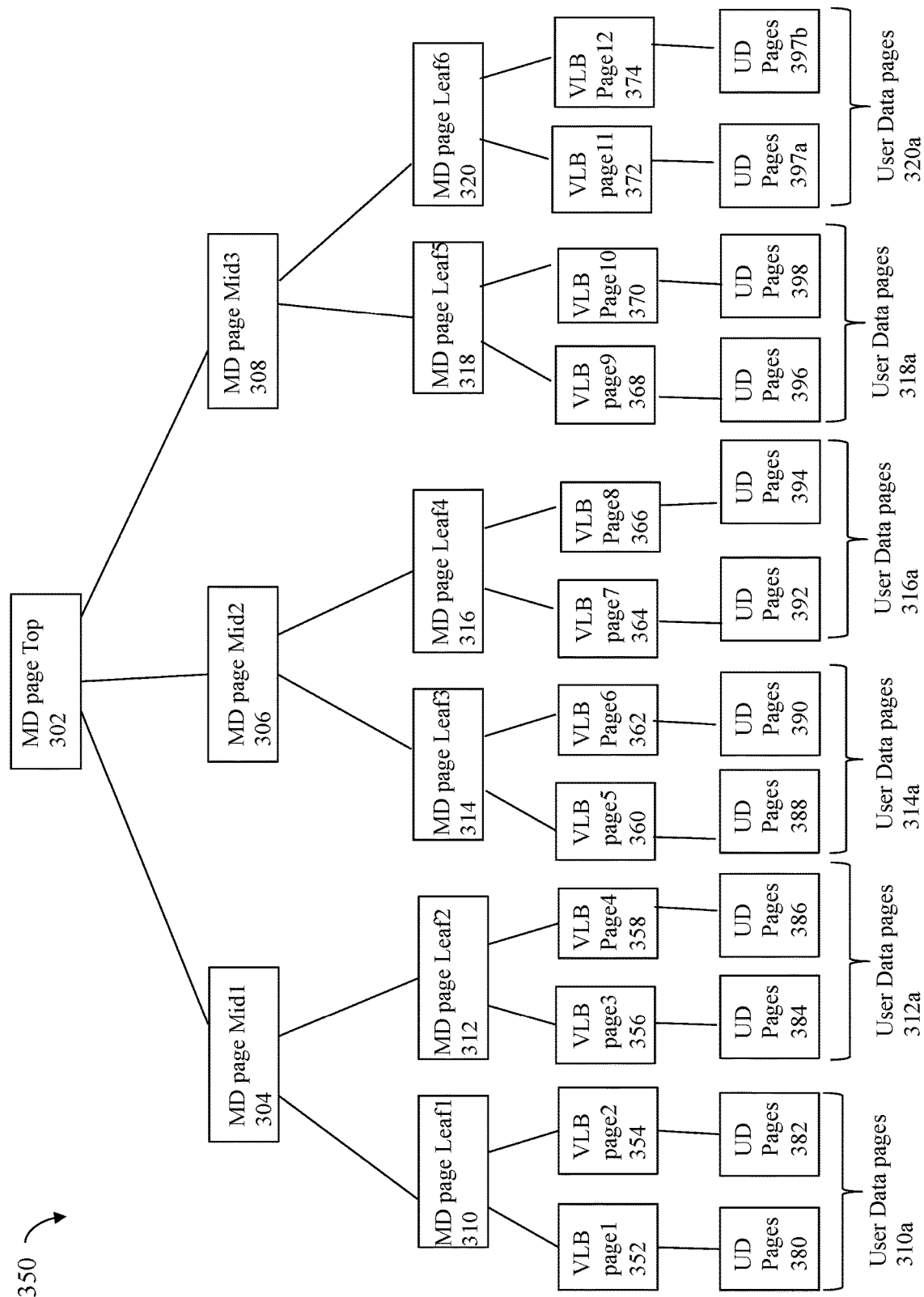

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
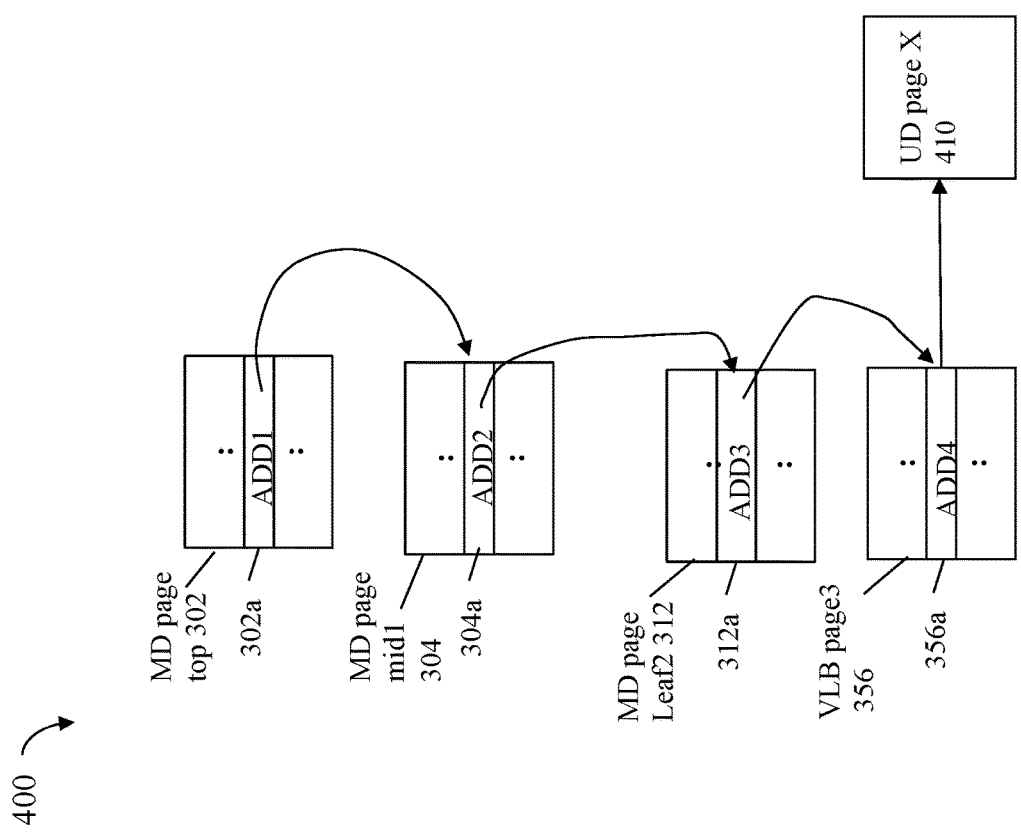

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6:
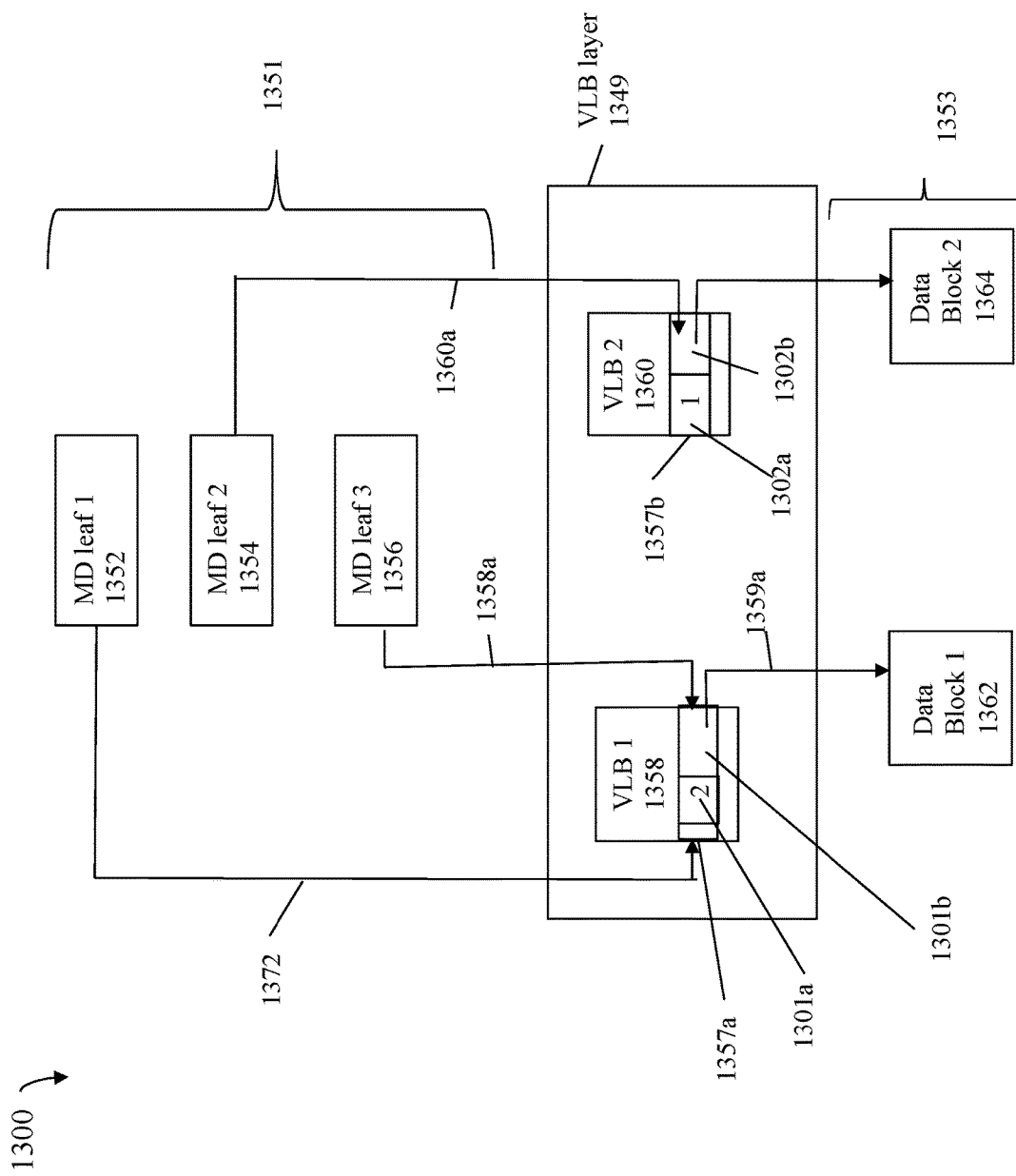

Referring to FIG. 6, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357*a* of the VLB structure 1358, where the entry 1357*a* can further include fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1372 denotes a pointer to, or address of, the entry 1357*a* in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357*a* of the VLB structure 1358, where the entry 1357*a* can further include the fields 1301*a* and 1301*b*. The field 1301*b* can be a pointer to, or address of, the user data block 1362. The field 1301*a* can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-6 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6 can be persistently stored in a MD page store on the BE PDs of the system. In some contexts herein, the copy of a MD page as stored in the MD page store on the BE PDs can also be referred to herein as the on-disk copy of the MD page.

In some implementations, when an update is made to a MD page, the entire resulting MD page with the update applied can be stored in the metadata log file. In such implementations, an excessive amount of storage can used in connection with the metadata log file in that each MD page update can include storing an entire updated MD page in the metadata log file. Additionally, excessive amounts of node-local volatile memory of the nodes can be used in connection with node-local cached copies of portions of the metadata log file.

Workflows for some implementations to perform reads and writes to the MD page can include loading the entire MD page into the cache or volatile memory of a node, if the MD page is not already in the cache or volatile memory of the node.

A data storage system can perform different data services such as data deduplication discussed above to remove redundant or duplicate copies of data or content by storing a single copy of the user data and having multiple references or pointers to the same stored single copy. For example, the content or user data can be stored in a single data block that can be referenced by multiple logical addresses where the content of the data block is stored at all the multiple logical addresses.

In connection with data deduplication, the data block that includes the user data or content can be associated with a MD page, where the MD page can include a reference count denoting the number of references to the data block. For example reference is made back to FIG. 6 and discussion above regarding FIG. 6. In at least one embodiment using the MD structures as described, for example, in connection with FIGS. 3, 4, 5, and 6, the reference count associated with a data block can be included in an entry of a VLB page associated with the data block. For example with reference to FIG. 6, the VLB entry 1357*a* includes a field 1301*a* with the reference count=2 for the associated data block 1362; and the VLB entry 1357*b* includes a field 1301*a* with the reference count=1 for the associated data block 1364.

The reference count such as of the VLB entries 1357*a*, 1357*b*, can be updated in connection with deduplication processing. For example, deduplication processing can be performed on new data written to a target logical address by a write I/O operation. Deduplication processing can determine that the new data is a duplicate of existing data stored in a data block. Rather than store another copy of the same data in another data block, deduplication processing can include alternatively having the target logical address reference the single existing copy of the data as stored in the data block. As part of deduplication processing, the reference count associated with the single existing copy of the data block can be incremented as each additional reference to the same data block is made. In a similar manner, the reference count can be decremented as content of a particular logical address is modified or deleted to no longer be considered a duplicate of the single existing copy of the data block.

Consistent with other discussion herein in at least one embodiment, updates or modifications can be with respect to user data or stored content modified by client or host write I/Os as well as with respect to metadata, such as updates or modifications to the MD structure or mapping information described above. As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Garbage collection can be performed in connection with storage management of the BE PDs to reclaim and reuse free or invalidated physical storage as new data is written. In some cases, "holes" of storage storing old, unused or invalid content can be interspersed among portions of storage storing current valid content. Garbage collection can include performing processing which allows multiple holes of storage including unused or invalid data to be compacted into a single larger contiguous storage portion which can then be reused. Thus garbage collection processing can include moving first storage portions of valid data or content interspersed among holes of invalid content from a source to a target location to thereby make free or available a larger contiguous storage portion including the holes of invalid content.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the UD log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

Systems, such as data storage systems, can maintain and utilize a data cache to store frequently accessed pages of data. The data cache can be, for example, a form of fast volatile memory such as a form of random access memory (RAM). In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from backend (BE) non-volatile storage. A cache miss as compared to a cache hit results in an I/O performance penalty and increased I/O latency in order to service the read I/O and return the requested read data to the requester. Thus, use of the data cache can provide for read cache hits and optimized performance such as by providing for improved I/O latency and improved utilization of system resources. Generally, the data cache can be characterized as a critical and expensive resource which can have a limited size or capacity. Accordingly, it is important for systems to utilize the data cache, and more generally cache storage, efficiently to provide for optimal performance.

Consistent with other discussion herein, data storage systems can provide various data storage services such as data deduplication. With data deduplication, different techniques can be utilized to identify duplicate stored data or content. For example, three write I/Os can write the same content C1, respectively, to three different logical addresses. Each of the logical addresses can be a different logical address and can be expressed as a user volume or logical device and a logical offset within the user volume or logical device. For example, the content C1 can be written to the 3 different logical addresses LA1, LA2 and LA3. With deduplication, only a single unique instance of the duplicate content C1 is stored on the BE non-volatile storage and each of the 3 logical addresses LA1, LA2 and LA3 can reference the same physical address on the BE non-volatile storage where the content C1 is stored. In this manner, the amount or capacity of BE non-volatile storage can be reduced and used more efficiently to store content such as user data. The data cache used in such a system performing deduplication can be indexed or organized using logical addresses as the key. In this manner, content such as user data which is stored in the cache can be accessed by logical address. Since such a data cache is organized by logical address, the cache can contain several instances of the same data page or content. For example with reference to LA1, LA2 and LA3 noted above all storing the same content C1, the data cache can include 3 entries, one for each of the 3 logical addresses, where each such cache entry stores the same content C1. The foregoing can be characterized as an inefficient use of cache, such as a data cache used to store read data, in systems providing data deduplication.

In some scenarios, a large amount of data cache can be used to inefficiently store duplicate data pages or content thereby resulting in an undesirable performance hit and increased I/O latency. One such scenario is a boot storm scenario where, for example, there can be many identical deduplicated virtual machines (VMs) booting such as on a host. There can be a large amount of duplicate content requested or read in connection with booting the VMs. The duplicate content can be stored at many different logical addresses. For example, an entire data cache can contain 100 unique data pages that are duplicated for thousands of logical addresses. In this manner, the cache can include many duplicate copies of a unique data page, where each copy of the same data page which is referenced by a different logical address is stored in a different cache entry.

Accordingly, described in the present disclosure are techniques that provide for improved and efficient use of the cache, such as used to store read data. The techniques can be used to eliminate caching duplicate content which can be referenced by multiple logical addresses.

In at least one embodiment, mapping information, such as included in various pages of a hierarchical structure as described, for example, in connection with FIGS. 3, 4, 5 and 6, can be used to map a logical address of user data (UD) to a physical address or BE storage location of the content stored at the logical address. Generally, the MD pages can be used in connection with chains of mapping information that map logical addresses to storage locations including content stored at the logical addresses. In at least one embodiment, the MD pages of the mapping information can map a logical address LA1 to a corresponding BE storage location, P1, including the content C1 stored at LA1. The MD pages or mapping information can be characterized as a chain forming an access sequence including a top MD page, a mid MD page, a leaf MD page, and a VLB (virtualization layer block), where an entry of the VLB points to or references the storage location P1 containing the stored content C1 of the logical address LA1 (e.g., the entry of the VLB can include the address of P1). In connection with duplicated content in a system performing deduplication where there are two logical addresses LA1 and LA2 both storing the same content C1, two different chains of mapping information can reference or point to the same storage location P1.

When a read cache miss occurs in connection with requested read data not in cache, the requested read data can be read from the BE storage location. For example, a read cache miss can occur when a read I/O requests to read content stored at the logical address LA.

In at least one system without using the techniques of the present disclosure, such a read cache miss can always include loading the mapping information pages (e.g., MD and VLB pages) into the cache if any such pages are not already in cache, and traversing the sequence or chain of such pages to access the requested content C1 from the BE storage location P1.

In at least one embodiment in accordance with the techniques of the present disclosure in which deduplication is performed, a two-level caching technique can be utilized to read requested data of a logical address, where such data or content is stored at a BE storage location. The two-level caching technique can be utilized to service a read cache miss such as when a read cache miss occurs in connection with a read I/O operation that reads content from LA1 or LA2 noted above. The two-level caching technique can be used to read C1 which can be stored in cache. In at least one embodiment, the two-level caching technique can utilize a first cache, sometimes referred to as the ULXA or logical address cache, and a second cache, sometimes referred to as the VLB cache. The ULXA cache can map logical addresses to corresponding VLB entries. The VLB cache can map VLB entries to associated content or data stored in the VLB cache on the data storage system. In particular, the ULXA cache can map a logical address, such as LA1, to an address A1 of a VLB entry, where the VLB entry can be used to access the content or data C1 stored at the logical address LA. The address A1 of the VLB entry, as obtained from the ULXA cache entry for LA1, can then be used to index into the VLB cache and obtain, from the VLB cache, the content C1 of LA1. Thus, servicing a read cache miss for LA1 can include performing a first cache lookup in the ULXA cache using the logical address LA1 to obtain the address A1 of the VLB entry; and then performing a second cache lookup in the VLB cache using A1 to obtain the content C1 as stored in the VLB cache.

In such an embodiment in accordance with the techniques of the present disclosure, the two-level caching technique or two-level lookup can include searching for a VLB entry (or address thereof) in the ULXA cache for the logical address LA1, and then using the VLB entry (or address thereof) as a key to index or search the VLB cache for the content or data C1, whereby C1 is stored at the logical address LA1.

In such an embodiment in accordance with the techniques of the present disclosure, the ULXA cache and the VLB cache can be utilized to service read cache misses. In such an embodiment, it is possible to experience a cache miss in connection with the ULXA cache or VLB cache. In the case where there is a ULXA cache miss for LA1, the regular default mapping information resolution using the chain of pages can be utilized to obtain the address A1 of the VLB entry associated with the content C1 stored at LA1. Subsequently, the address A1 of the VLB entry can be used to index into the VLB cache and obtain C1 stored in the VLB cache.

If there is a VLB cache miss in connection with the address A1 of the VLB entry E1, the VLB page corresponding to A1 (e.g., where the VLB page includes the VLB entry E1) can be read from the BE storage into cache. Subsequently, P1 can be read or accessed on the BE storage using E1, where E1 is now stored in cache. In at least one embodiment, the VLB entry E1 can include P1, where P1 denotes a reference, pointer or address of a BE storage location storing the desired content C1.

In at least one embodiment, a user data (UD) or client logical address, which can be the target logical address of a client I/O operation such as a read or write operation, can be uniquely identified using the volume or LUN ID (identifier) in combination with the LBA or offset. In at least one embodiment, the logical address denoted by the combination of the volume or LUN ID and the LBA or offset can be mapped to, and represented using, a ULXA value, where the value of the ULXA can be generally characterized as an identifier uniquely identifying a particular user data (UD) page within a data storage system, and if multiple storage systems are included in a cluster, uniquely identified within the cluster of data storage systems. Thus, the ULXA can be a value that denotes or represents the logical address such as the UD logical address. From a given ULXA value, the uniquely associated LUN ID and LBA can be mapped or determined. Also, given a particular LUN ID and LBA (e.g., logical address), the unique corresponding ULXA value can be mapped or determined. In at least one embodiment in accordance with the techniques of the present disclosure, the ULXA value and/or its corresponding logical address can be used as an index into the ULXA cache. In the following paragraphs, reference can be made to accessing or indexing into the ULXA cache using logical addresses. Alternatively, corresponding ULXA values can also be utilized.

The foregoing and other aspects of the techniques of the present disclosure are described in more detail in the following paragraphs.

Figure 7:
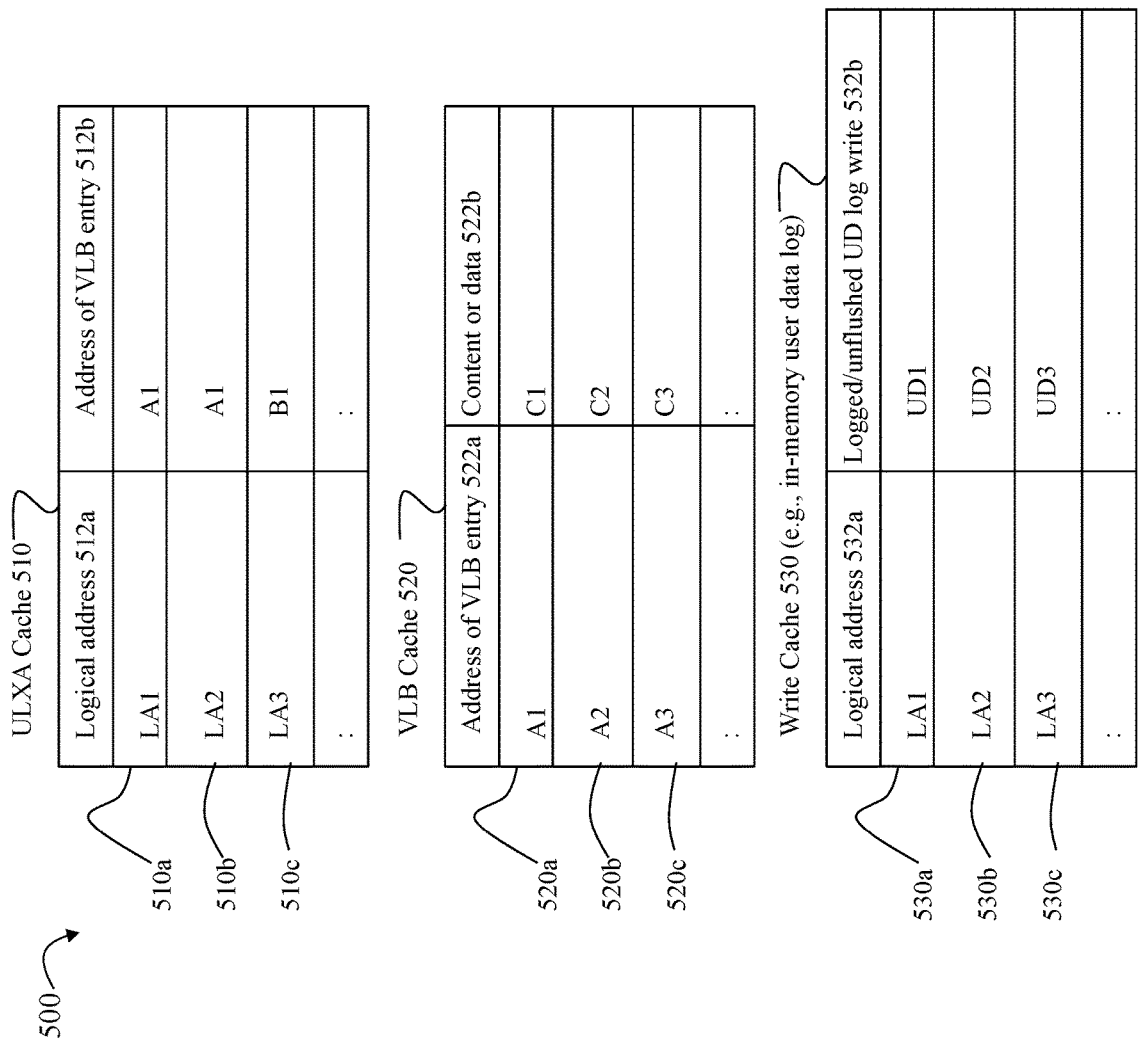
FIG. 7 is an example illustrating information that can be cached in at least one embodiment in accordance with the techniques of the present disclosure.

Referring to FIG. 7, shown is an example 500 illustrating the VLB cache, the ULXA cache, and a write cache which can be used in at least one embodiment in accordance with the techniques of the present disclosure.

The example 500 includes the ULXA cache 510 and the VLB cache 520. The ULXA cache 510 can include entries where each entry of 510 maps a logical address 512a to a corresponding address of a VLB entry 512b. The VLB entry addresses denoted in the column 512b can be content or data cached in the ULXA cache. The ULXA cache 510 can be organized, indexed and/or accessed by logical address 512a, whereby logical addresses 512a can be used as keys to index into the ULXA cache 510 to obtain corresponding content 512b cached in the ULXA cache 510. Logically, the ULXA cache can be organized as a key-value store or database (DB) where the logical addresses 512a are values used as the "key" and where the returned "value" for the "key" denotes the corresponding cache location containing the address of a corresponding VLB entry (512b). For example, the entry 510a maps logical address LA1 to its corresponding VLB entry address or pointer A1, indicating that the mapping information of the chain of MD pages for LA1 maps to the VLB entry address A1. Thus, the entry 510a provides a shortcut for LA1 by storing A1, the result of the mapping information lookup for the VLB entry address for LA1, in the column 512b. To further illustrate, reference is made back to FIG. 5. Assume that FIG. 5 illustrates the mapping information or chain of MD and VLB pages mapping LA1 to a physical storage location in 410 containing the content stored at LA1. The entry 510 includes the address A1 denoting the address of the VLB entry 356a of FIG. 5, where the VLB entry 356a of the VLB 356 further includes a pointer or address to the physical storage location (e.g., on BE storage) containing the content stored at LA1. With reference to FIG. 6, the entry 510a can, for example, include in the column 512b the address A1 of the VLB entry 1357a of VLB 1358.

Returning to FIG. 7, in a similar manner, the entry 510b maps logical address LA2 to its corresponding VLB entry address A1, indicating that the mapping information of the chain of MD pages for LA2 also maps to the VLB entry address A1. Thus, the entry 510b provides a shortcut for LA2 by storing A1, the result of the mapping information lookup for the VLB entry address for LA2, in the column 512b. It should be noted that because the entries 510a and 510b both include the same VLB entry address A1, thereby denoting the same VLB entry of the same VLB, the logical addresses LA1 and LA2 both reference the same content or data C1 as a result of deduplication. For example referring back to FIG. 6, a first MD leaf entry from MD leaf 1 1352 points (1372) to the VLB entry 1357a, and a second MD leaf entry from MD leaf 3 1356 points (1358a) to the VLB entry 1357a. The MD leaf 1352 and VLB 1358 can be included in a first chain of mapping information for LA1, and the MD leaf 1356 and VLB 1358 can be included in a second chain of mapping information for LA2, where both of the foregoing chains of mapping information reference the same deduplicated content C1 stored as a single unique instance on a storage location of a BE PD.

Returning to FIG. 7, the entry 510c maps logical address LA3 to its corresponding VLB entry address B1, indicating that the mapping information of the chain of MD pages for LA3 maps to the VLB entry address B1. Thus, the entry 510c provides a shortcut for LA3 by storing B1, the result of the mapping information lookup for the VLB entry address corresponding to LA3, in the column 512b.

The VLB cache 520 can include entries where each entry of 520 maps an address of a VLB entry 522a to content or data 522b stored in the VLB cache. The content or data denoted in the column 522b can be cached in the VLB cache. The VLB cache 520 can be organized, indexed and/or accessed by VLB entry address 522a, whereby the VLB entry addresses, pointers or references can be used as keys to index into the VLB cache 520. Logically, the VLB cache can be organized as a key-value store or database (DB) where the VLB entry addresses, pointers or addresses are values used as the "key" and where the returned "value" for the "key" denotes the cache location of the corresponding cached content or data (stored in the VLB cache). The entry 520a maps the VLB entry address A1 (522a) to its corresponding cached content or data (522b), indicating that the VLB entry address A1 (522a) references or points to the cached content or data C1 (522b). The entry 520b maps the VLB entry address A2 (522a) to its corresponding cached content or data (522b), indicating that the VLB entry address A2 (522a) references or points to the cached content or data C2 (522b). The entry 520c maps the VLB entry address A3 (522a) to its corresponding cached content or data (522b), indicating that the VLB entry address A3 (522a) references or points to the cached content or data C3 (522b).

The VLB cache 520 does not cache any duplicate content or data. Put another way, each entry of the VLB cache 520 stores unique content or data which can be referenced by one or more different logical addresses.

In one aspect, the ULXA cache 510 and the VLB cache 520 can be characterized, respectively, as a first shortcut and a second shortcut used in order to bypass the default mapping information resolution processing described herein which traverses the chain or sequence of mapping information such as described in connection with FIGS. 3-6. Collectively, the ULXA cache 510 and the VLB cache 520 form a two-level caching structure. In at least one embodiment as described in more detail elsewhere herein, the two-level caching structure formed by the ULXA cache 510 and the VLB cache 520 can be used in connection with read cache miss processing for servicing a read I/O operation resulting in a read cache miss.

Consistent with discussion above, the VLB cache 520 can include entries, where each entry includes a key 522a and associated data or content 522b stored in the VLB cache 520. Cached data (522b) stored in the VLB cache 520 is indexed, accessed and organized using keys (522a) associated with the cached data. In at least one embodiment, values of the keys 522a can be references, pointers or addresses used to access the data blocks as stored on a BE PD, where such data blocks include stored user data or content (522b). In at least one embodiment, each key 522a can be an address or pointer used to indirectly access the data block on a BE PD. In at least one embodiment, the key 522a for a data block stored in the VLB cache 520 can be the address of, or pointer to, an entry in a VLB node, page or structure of the mapping information (e.g, MD mapping a logical address to its corresponding content as persisted on a BE PD), where the VLB entry includes the reference count for the data block and where the VLB entry includes the address of, or pointer to, the data block. Thus, in such an embodiment, the values used for the keys 522a of the VLB cache 522 correspond to the cached content (512b) of the ULXA cache 510. For example reference is made to the entry 510a of the ULXA cache 510 and the corresponding entry 520a of the VLB cache 520. The entry 510a of the ULXA cache 510 indicates that the value A1 (512b) is cached content of the ULXA cache mapped to or associated with the logical address LA1 (512a). Further, assuming the entry 520a is stored in the VLB cache as illustrated, the value A1 (e.g., cached content 512b in the ULXA cache 510 as denoted by the entry 510a) can be used as an index into the VLB cache 520 to identify the particular entry or location 520a in the VLB cache 520 including the cached content "C1". In this manner, a reference or pointer A1 used to access the data block on the BE PD storing "C1" can also be used as an index into the VLB cache 520 to query whether the content C1 of the data block is stored in the VLB cache 520.

The write cache 530 can denote an in-memory copy of the user data (UD) log of recorded writes or updates which have not yet been flushed from the UD log, where such recorded writes or updates are indexed by logical address (denoting the target logical addresses of the writes or updates of stored user data or content). The UD log is described generally elsewhere herein, such as, for example, in connection with FIGS. 2B, 2C and 2D. Consistent with other discussion herein, the UD log can be stored persistently and can also be stored in volatile memory using a logical organization as denoted by the write cache 530. The write cache 530 can be represented by the entries of 530, where each entry of 530 maps a logical address 532a to a recorded write or update of a user data 522b stored in the write cache. The recorded writes or updates in 532 can be in-memory copies of writes or updates a recorded in the persistently stored entries of the UD log.

The logged or unflushed UD log write denoted in the column 532b can be cached in the write cache. The write cache 530 can be organized, indexed and/or accessed by logical address 532a, whereby the logical addresses (532a) can be used as keys to index into the write cache 530 to obtain corresponding recorded or logged write I/O operations (532b). Logically, the write cache can be organized as a key-value store or database (DB) where the logical addresses (532a) are values used as the "key" and where the returned "value" for the "key" denotes the cache location of the corresponding logged or recorded unflushed UD log write (stored in the write cache). The entry 530a maps the logical address LA1 (532a) to its corresponding logged write update UD1 (532b). The entry 530b maps the logical address LA2 (532a) to its corresponding logged write update UD2 (532b). The entry 530c maps the logical address LA3 (532a) to its corresponding logged write update UD3 (532b).

In at least one embodiment, the write cache 530 can be characterized as a short term cache, and entries or cached content 532b of 530 can be cleaned or removed when the corresponding logged UD page (532b) is flushed from the UD log. In other words, a logged UD page 532b stored in the write cache can exist as a "write cache object" until it is flushed from the UD log.

In at least one embodiment, the ULXA cache 510 can be organized as a hash table of buckets. The key, which is the logical address (512a), can be hashed using a hash function H such that H(key)=a hash value HV denoting a bucket of one or more keys or logical addresses which map to the same HV. The hash table can include a large number of buckets so that the list of entries associated with a single bucket contains a limited number of entries. In this manner, searching or querying the ULXA cache to determine whether the ULXA cache includes an entry for a particular logical address can be performed without incurring undesirable runtime computational costs. In at least one such embodiment, searching or querying the ULXA cache to determine whether the ULXA cache includes an entry for a particular logical address LA can include determining a hash value HV for the logical address LA, and then searching the bucket of entries mapped to the HV entry of the hash table to determine whether the bucket includes an entry with a matching logical address LA.

Figure 8A:
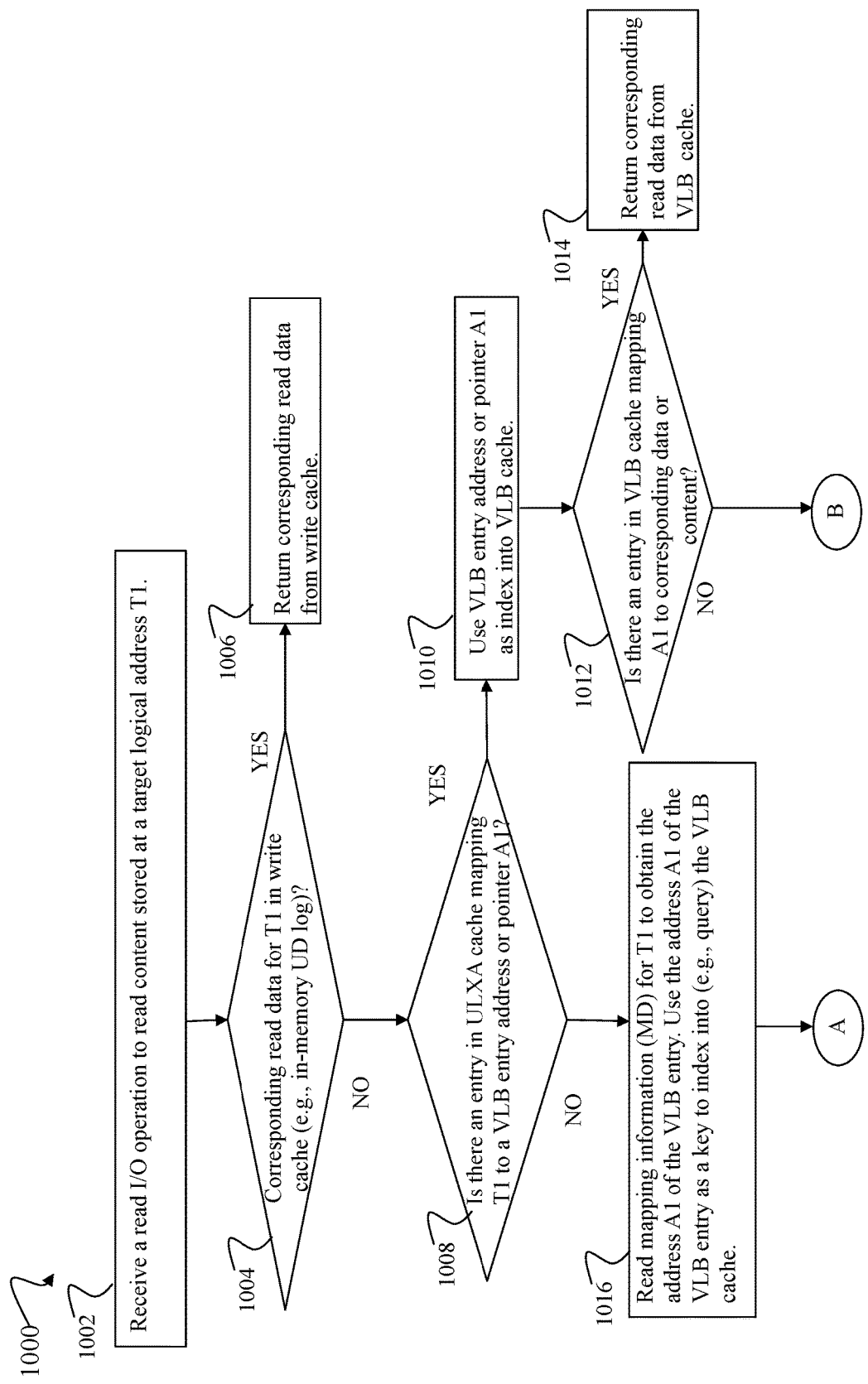
FIGS. 8A and 8B are flowcharts of processing steps that can be performed in at least one embodiment in accordance with the techniques of the present disclosure.
Figure 8B:
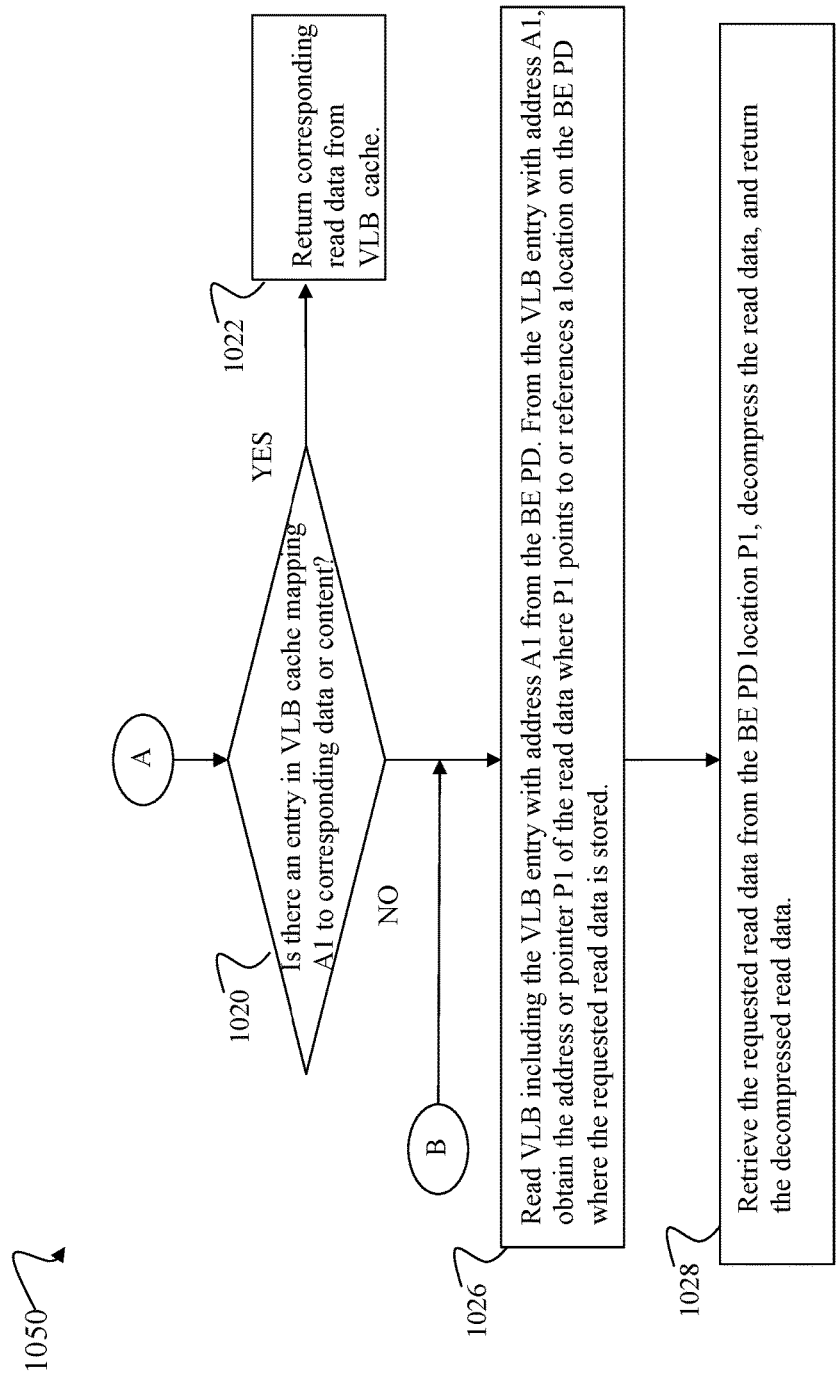

Referring to FIGS. 8A and 8B, shown is a flowchart 1000, 1050 of steps that can be performed in at least one embodiment of the techniques of the present disclosure. The flowchart of FIGS. 8A and 8B outline processing that can be performed for servicing a read I/O operation using the caching structures of FIG. 7.

At the step 1002, a read I/O operation is received. The read I/O operation is a request to read content stored at a target logical address T1. T1 can denote a logical address of user data. The logical address can be in the form of a volume or logical device (e.g., LUN) and logical offset (e.g., LBA) within the specified volume or logical device. From the step 1002, control proceeds to the step 1004.

At the step 1004, a determination can be made as to whether the corresponding read data for T1 is stored in the write cache denoting the in-memory UD log. The step 1004 can include querying or searching the write cache to determine whether the write cache includes an entry E1 with a corresponding key or index=T1. If the write cache does include such an entry E1 with a corresponding key or index=T1, the step 1004 evaluates to true or yes and control proceeds to the step 1006. At the step 1006, processing includes returning the corresponding read data from the write cache, where the corresponding read data is mapped or associated with the entry E1. With reference to FIG. 7, the step 1004 evaluates to true or yes when the write cache 530 includes an entry E1 with a logical address in 532a matching T1, and then step 1006 includes retrieving the read data from the UD page in 532b of the matching entry. If the write cache does not include such an entry E1 with a corresponding key or index=T1, the step 1004 evaluates to no or false and control proceeds to the step 1008.

At the step 1008, a determination is made as to whether there is an entry E2 in the ULXA cache mapping T1 to a VLB entry address or pointer A1. The step 1008 can include querying or searching the ULXA cache to determine whether the ULXA cache includes an entry E2 with a corresponding key or index=T1. If the ULXA cache does include such an entry E2 with a corresponding key or index=T1, the step 1008 evaluates to true or yes and control proceeds to the step 1010.

At the step 1010, the VLB entry address or pointer A1 (obtained as the value from the ULXA cache entry E2) can be used as an index into the VLB cache. From the step 1010, control proceeds to the step 1012 where a determination is made as to whether there is an entry E3 in the VLB cache mapping the VLB address or pointer A1 to corresponding data or content. With reference to FIG. 7, the step 1012 evaluates to true or yes when the VLB cache 520 includes an entry E3 with an address of a VLB entry in 522*a* matching the VLB entry address or pointer A1 (obtained as the value from the ULXA cache entry E2). If the step 1012 evaluates to yes, control proceeds to the step 1014 to retrieve and return the corresponding read data or content as cached in the VLB cache, where the read data is the content or data (522*b*) associated with the matching entry E3 of the VLB cache (e.g., where the entry E3 of the VLB cache includes a "key" (522*a*) matching the VLB entry address or pointer A1 (where A1 is obtained as the value from the ULXA cache entry E2)). If the step 1012 evaluates to no, control proceeds to the step 1026.

At the step 1026, processing can include reading the VLB page, which includes the VLB entry with the address A1, from the BE PDs. The address or pointer P1 to the read data is obtained from the VLB entry with address A1. Put another way, the VLB page or block can include multiple VLB entries where one of the VLB entries corresponds to the VLB entry with the address A1. The VLB entry with the address A1 can further include an address or pointer P1 which points to or references a location on the BE PDs where the requested read data is stored. From the step 1026, control proceeds to the step 1028.

At the step 1028, processing is performed to retrieve the requested read data from the BE PD location P1, and return the requested read data. Additionally, if the read data is compressed, the step 1028 can include decompressing the read data before returning so that the decompressed form of the read data is returned.

Returning to the step 1008, if the ULXA cache does not include such an entry E2 with a corresponding key or index=T1, the step 1008 evaluates to false or no and control proceeds to the step 1016. At the step 1016, processing can be performed to read the mapping information (e.g., MD and chain of MD pages) for T1 to obtain the address A1 of the VLB entry. The step 1016 then uses the address A1 of the VLB entry (where A1 is obtained from the mapping information of MD for T1) as a key to index into (e.g., query) the VLB cache. From the step 1016, control proceeds to the step 1020.

At the step 1020, a determination is made as to whether there is an entry in the VLB cache mapping A1 to corresponding data or content. With reference to FIG. 7, the step 1020 evaluates to true or yes when the VLB cache 520 includes an entry E4 with a VLB entry pointer or address in 522*a* matching A1. If the step 1020 evaluates to yes or true, control proceeds to the step 1022. The step 1022 includes retrieving and returning the corresponding read data (522*b*) from the matching VLB cache entry E4 of the VLB cache 520. With reference to FIG. 7, the step 1020 evaluates to false or no when the VLB cache 520 does not include an entry E4 with a VLB entry pointer or address in 522*a* matching A1. If the step 1020 evaluates to no or false, control proceeds to the step 1026.

As described above in connection with the processing of FIGS. 8A and 8B for a read I/O operation, there can be cache hits in both the ULXA cache and the VLB cache (e.g., steps 1008 and 1012 both evaluate to yes); there can be a cache hit for the ULXA cache (step 1008 evaluates to yes) and a cache miss for the VLB cache (step 1012 evaluates to no); there can be cache misses for both the ULXA cache and the VLB cache (step 1008 evaluates to no and step 1020 evaluates to no); and there can be a ULXA cache miss (step 1008 evaluates to no) and a VLB cache hit (step 1020 evaluates to yes).

In at least one embodiment, an entry can be added to the write cache when a corresponding UD write I/O operation is recorded in the log (e.g., UD log). In at least one embodiment, an entry can be removed from the write cache when a corresponding UD write I/O operation is flushed from the log (e.g., UD log).

In at least one embodiment, the ULXA cache and the VLB cache can be maintained completely independent of each other. Each such caches, as well as the write cache 530, can have their own independent retention and cache management policies. It should be noted that each entry of the ULXA cache is relatively small so generally a larger number of entries can be retained in the ULXA cache. In at least one embodiment, the ULXA cache can utilize a policy to retain in entries for those logical address which are the hottest or most frequently accessed such as most frequently read.

In at least one embodiment, an entry can be added to the VLB cache when requested read data (resulting from a read cache miss) is read from the BE PDs. For example in at least one embodiment, an entry can be added to the VLB cache after the requested read data is read from the BE PD location in the step 1028. It should be noted that such a VLB cache entry can be added as the result of a read miss resulting from one of multiple logical addresses which reference or store the read data. Such multiple logical addresses can store the same read data having a single unique instance stored on the BE PDs. The single unique instance of the read data, as referenced by the multiple logical addresses, can be stored on the BE PDs as a result of deduplication processing.

In at least one embodiment, an entry can be removed from the VLB cache if the corresponding VLB entry has been modified or invalidated such by another workflow. For example as described in connection with FIG. 6, a VLB entry such as 1357*a* can include a reference, pointer or address to a BE PD location of a data block storing content. As a result of another workflow, the reference or pointer 1359*a* or another field of the VLB entry 1357*a* can be modified such that the VLB entry is no longer valid. As a result, the VLB cache entry corresponding to the address of the modified or invalidated VLB entry 1357*a* can be removed from the VLB cache. In at least one embodiment, a VLB entry can also be removed from the VLB cache in accordance with the particular retention or eviction policy of the VLB cache. In such an embodiment the VLB cache can utilize a least recently used or LRU policy to evict entries from the VLB cache as needed to make room for adding new entries when the cache is full. With an LRU-based policy, least recently used entries can be evicted prior to other entries which have been more recently referenced or used.

In at least one embodiment, an entry can be added to the ULXA cache as part of read I/O processing after reading the mapping information for a logical address and when the address of the VLB entry mapping to a BE PD location of content stored at the logical address is known. For example with reference to FIG. 8A, a ULXA cache entry can be added to the ULXA cache for the target logical address T1 after the step 1016 has been completed as a result of a ULXA cache miss (e.g., where the step 1008 evaluates to no).

In at least one embodiment, a ULXA cache entry can be removed from the ULXA cache if the content stored at the corresponding logical address of the ULXA cache entry has been updated such as, for example, as a result of regular write I/O workflow where there have been multiple writes to the same logical address of the ULXA cache entry. In at least one embodiment, there can be other workflows and operations that can also update or modify content stored at the logical address of a ULXA cache entry. Such other workflows or operations can include, for example, UNMAP AND XCOPY (Extended Copy) commands. Such offload copying commands like XCOPY can be used for data copying between SCSI targets in the same data storage system. The XCOPY command is a SCSI command included in the SCSI standard. Generally, the offload copy operation request can be issued by an external data storage system client, such as a host, as well as an internal data storage system client. In at least one embodiment, the offload copy operation or command, such as the XCOPY command noted above, is a request to perform an offload copy operation from a source to a destination or target. The source and the destination of the XCOPY or other offload copy operation can be specified in any suitable manner. For example, in at least one embodiment, the source can identify one or more logical devices or LUNs, and an associated LBA range of each of the one or more LUNs of the source; and the destination can also identify one or more logical devices or LUNs, and an associated LBA range of each of the one or more LUNs of the destination. The particular manner in which the LUNs are identified can vary with the particular protocol used to access the LUNs. For example, in at least one embodiment in accordance with the SCSI protocol, a LUN of the source or destination of the XCOPY command can be identified using the world wide name (WWN) used to uniquely identify the LUN at a protocol level identifier across the first and second systems, or more generally across multiple data storage systems. Such an offload copy command like XCOPY requests or instructs the data storage system to generally perform an offload copy command internal within the data storage system because both the source and destination of the copy command are within the same data storage system. Generally, the client, such as the host, requests using the XCOPY command that the data storage system manage the copying of the data from the source to the destination. The source and destination of the XCOPY command refer to storage objects, such as block-based addresses of logical devices, volumes, or LUNs, typically in the same system. For example, the source may be a location or logical address on a source device denoting a source LUN of the data storage system that received the XCOPY command. The destination or target of the XCOPY command may be a location or logical address on a target device that is also a logical device denoting the destination or target LUN of the data storage system that received the XCOPY command. The UNMAP command can be used to unmap and thus reclaim space or physical storage associated with specified logical addresses.

In at least one embodiment, a ULXA cache entry for a logical address can be removed from the ULXA cache if a corresponding pointer to the VLB entry is updated where the corresponding pointer to the VLB entry is included in a MD leaf entry which is updated.

In at least one embodiment, a ULXA cache entry can also be removed from the ULXA cache in accordance with the particular retention or eviction policy of the ULXA cache. In such an embodiment the ULXA cache can utilize an LRU policy to evict entries from the VLB cache as needed to make room for adding new entries when the ULXA cache is full.

In at least one embodiment, policies implemented to enforce removal of entries from the ULXA cache and the VLB cache can guarantee consistency among both caches. For example, the caching policies can ensure that if a first ULXA cache entry is stale in that its logical address has been updated, that stale ULXA cache entry is removed from the ULXA cache. As another example, a ULXA cache entry is not mapped to a stale VLB entry which has been modified to point to new or different content. If the VLB entry is updated to point to new or different content, the VLB cache entry including the address of the updated VLB entry can be removed from the VLB cache. An update to a VLB entry that causes an effective change of the data or content accessed through this VLB entry can be done together with any corresponding MD leaf updates to avoid data corruption. In such an embodiment, an update to a VLB entry:

can relate to an unreferenced VLB entry (i.e., there is no logical address in the ULXA cache which references the VLB entry address);

may be part of data deduplication where a VLB entry is updated from a first address referencing first content to a second address to reference second content, where the first address and second address can differ but where the first content is the same as the second content (e.g., the data referenced by the VLB is effectively the same) such that the corresponding entry in the VLB cache references the same content or data; or can be done in a same transaction with any desired corresponding MD leaf updates so any corresponding affected ULXA cache entries are also removed.

In scenarios such as those examples noted above, cross consistency of caches is provided by caching policies in that, for example, there is no scenario when a ULXA cache entry is stale and references a VLB entry which has been updated so that the ULXA cache entry improperly has a logical address that is mapped to a VLB entry referencing wrong or incorrect content which is not actually stored at the logical address.

In at least one embodiment, the ULXA cache maintains much of the same information as MD leaf pages, which can also be stored in cache, with a difference being size granularity. For example in at least one embodiment consistent with other discussion herein, the MD leaf granularity can be 512 VLB entries (e.g., each MD leaf can point to or reference 512 VLB entries) while the granularity of each ULXA cache entry is 1 VLB entry (e.g., each ULXA cache entry can include the address of a single VLB entry). Generally, the more sparse the MD leaves are and the more random the read workload, the more efficient the ULXA cache can be in comparison to caching entire MD leaf pages in cache such as a MD cache. In at least one embodiment, entire MD leaf pages may not be cached in the MD cache. An embodiment can omit caching entire MD leaf pages in the MD cache and can alternatively maintain desired ULXA cache entries for only valid MD leaf entries currently mapped or used with logical addresses. For example, a MD leaf page can include 512 entries for 512 corresponding logical addresses. However, it may be that only a small number, such as 10, of the 512 MD leaf entries are actually associated with content for logical addresses. It may be that the remaining 502 MD leaf entries are associated with 502 logical addresses that have never been written to. In this case, rather than cache all 512 entries of the entire MD leaf where only 10 such MD leaf entries include pointers or addresses of VLB entries, 10 corresponding entries can be added to the ULXA cache where each such ULXA cache entry can map one of the 10 logical addresses which have been written to, to an address or pointer of a corresponding VLB entry. Generally, any suitable policy can be enforced which specifies what ULXA cache entries mapped to corresponding VLB entry pointers or addresses are included in the ULXA cache.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
    receiving a read I/O operation that reads first content stored at a target logical address;
    determining, using the target logical address as a first key to index into a first cache, whether the first cache includes a first cache entry corresponding to the target logical address; and
    responsive to determining that the first cache includes the first cache entry corresponding to the target logical address, performing processing including:
        obtaining first metadata from the first cache entry of the first cache;
        determining, using the first metadata of the first cache entry as a second key to index into a second cache, whether the second cache includes a second entry caching first content stored at the target logical address;
        responsive to determining that the second cache includes the second cache entry, returning the first content from the second entry of the second cache in response to the read I/O operation; and
        responsive to determining that the second cache does not include the second entry, performing other processing including:
            determining, using the first metadata, a first physical storage location of the first content, wherein the first metadata is an indirect pointer or address to the first physical storage location;
            retrieving the first content from the first physical storage location as identified using the first metadata; and
            returning the first content, as retrieved from the first physical storage location using the first metadata, in response to the read I/O operation; and
    responsive to determining that the first cache does not include the first cache entry corresponding to the target logical address, performing first processing including:
        reading mapping information for the target logical address to obtain the first metadata of the mapping information, wherein the mapping information maps the target logical address to the first physical storage location including the first content, and wherein the first metadata is a reference used to access the first physical storage location and retrieve the first content;
        determining, using the first metadata obtained from said reading, whether the second cache includes the second entry caching the first content stored at the target logical address, wherein the first metadata obtained from said reading is used as the second key to index into the second cache; and
        responsive to determining, using the first metadata obtained from said reading, that the second cache includes the second entry, returning the first content from the second entry of the second cache in response to the read I/O operation.

2. The computer-implemented method of claim 1, wherein the first metadata used as the second key to index into the second cache is included in mapping information which maps the target logical address to the first physical storage location including the first content.

3. The computer-implemented method of claim 2, wherein the first physical storage location is included in a non-volatile storage device providing backend storage in a data storage system which receives the read I/O operation and which performs said method responsive to receiving the read I/O operation.

4. The computer-implemented method of claim 2, wherein the mapping information includes a plurality of metadata pages, wherein the plurality of metadata pages includes a first metadata page comprising a plurality of metadata entries including a first metadata entry, and wherein the first metadata, which used as the second key to index into the second cache, is a reference to, pointer to, or address of, the first metadata entry in the first metadata page.

5. The computer-implemented method of claim 1, wherein the second cache includes a plurality of data portions stored in a plurality of entries of the second cache, wherein the plurality of entries and the plurality of data portions are accessed using a plurality of keys associated with the plurality of entries.

6. The computer-implemented method of claim 5, wherein each of the plurality of data portions stored in the second cache is a single unique instance so that the second cache does not include any duplicate data portions.

7. The computer-implemented method of claim 6, wherein each of the plurality of data portions stored in the second cache is stored in an uncompressed form.

8. The computer-implemented method of claim 1, wherein said reading retrieves at least some of the mapping information from non-volatile storage, and wherein the mapping information includes a plurality of metadata pages, and wherein the first processing further includes:
    adding the first cache entry, which is associated with the target logical address as the first key, to the first cache.

9. The computer-implemented method of claim 1, wherein the first processing further includes:
    responsive to determining, using the first metadata obtained from said reading, that the second cache does not include the second entry, performing second processing.

10. The computer-implemented method of claim 9, wherein the second processing further includes:
- retrieving, from non-volatile storage, a first metadata page including a plurality of metadata entries comprising a first metadata entry, wherein the first metadata is a reference to, pointer to, or an address of, the first metadata entry, wherein the first metadata entry includes a field denoting the first physical storage location of the first content;
- retrieving, from the non-volatile storage using the field of the first metadata entry, the first content from the first physical storage location included in the non-volatile storage; and
- returning the first content retrieved from the non-volatile storage in response to the read I/O operation.

11. The computer-implemented method of claim 10, wherein the non-volatile storage provides back-end physical storage in a data storage system, and wherein the second processing further includes:
- adding the second entry, which is associated with the first metadata used as the second key, to the second cache.

12. The computer-implemented method of claim 1, further comprising:
- determining whether a log of recorded write operations includes a first record of a first write operation that writes to the target logical address, wherein the first record identifies first write data written by the first write operation;
- responsive to determining the log includes the first record of the first write operation that writes to the target logical address, returning the first write data as the first content stored at the target logical address; and
- responsive to determining the log does not include the first record of the first write operation that writes to the target logical address, performing said determining whether the first cache includes the first cache entry.

13. The computer-implemented method of claim 12, wherein a third cache includes the log of recorded write operations, and wherein each of the recorded write operations of the log stored in the third cache is indexed using a corresponding logical address written to by said each recorded write operation.

14. The computer-implemented method of claim 13, wherein the third cache only caches recorded write operations which have not yet been flushed from the log.

15. The computer-implemented method of claim 1, wherein the first cache includes another cache entry that stores the first metadata and that is associated with a second logical address which is different than the target logical address.

16. The computer-implemented method of claim 15, wherein the method includes:
- performing data deduplication processing which determines that the first content is duplicate content stored at both the target logical address and the second logical address, wherein first mapping information maps the target logical address to the first physical storage location, and wherein second mapping information maps the second logical address to the first physical storage location.

17. A system comprising:
- one or more processors; and
- a memory comprising code stored thereon that, when executed, performs a method comprising:
  - receiving a read I/O operation that reads first content stored at a target logical address;
  - determining, using the target logical address as a first key to index into a first cache, whether the first cache includes a first cache entry corresponding to the target logical address; and
  - responsive to determining that the first cache includes the first cache entry corresponding to the target logical address, performing processing including:
    - obtaining first metadata from the first cache entry of the first cache;
    - determining, using the first metadata of the first cache entry as a second key to index into a second cache, whether the second cache includes a second entry caching first content stored at the target logical address;
    - responsive to determining that the second cache includes the second cache entry, returning the first content from the second entry of the second cache in response to the read I/O operation; and
    - responsive to determining that the second cache does not include the second entry, performing other processing including:
      - determining, using the first metadata, a first physical storage location of the first content, wherein the first metadata is an indirect pointer or address to the first physical storage location;
      - retrieving the first content from the first physical storage location as identified using the first metadata; and
      - returning the first content, as retrieved from the first physical storage location using the first metadata, in response to the read I/O operation; and
  - responsive to determining that the first cache does not include the first cache entry corresponding to the target logical address, performing first processing including:
    - reading mapping information for the target logical address to obtain the first metadata of the mapping information, wherein the mapping information maps the target logical address to the first physical storage location including the first content, and wherein the first metadata is a reference used to access the first physical storage location and retrieve the first content;
    - determining, using the first metadata obtained from said reading, whether the second cache includes the second entry caching the first content stored at the target logical address, wherein the first metadata obtained from said reading is used as the second key to index into the second cache; and
    - responsive to determining, using the first metadata obtained from said reading, that the second cache includes the second entry, returning the first content from the second entry of the second cache in response to the read I/O operation.

18. A non-transitory computer readable medium comprising code stored thereon that, when executed, performs a method comprising:
- receiving a read I/O operation that reads first content stored at a target logical address;
- determining, using the target logical address as a first key to index into a first cache, whether the first cache includes a first cache entry corresponding to the target logical address; and
- responsive to determining that the first cache includes the first cache entry corresponding to the target logical address, performing processing including:

obtaining first metadata from the first cache entry of the first cache;

determining, using the first metadata of the first cache entry as a second key to index into a second cache, whether the second cache includes a second entry caching first content stored at the target logical address;

responsive to determining that the second cache includes the second cache entry, returning the first content from the second entry of the second cache in response to the read I/O operation; and responsive to determining that the second cache does not include the second entry, performing other processing including:

determining, using the first metadata, a first physical storage location of the first content, wherein the first metadata is an indirect pointer or address to the first physical storage location;

retrieving the first content from the first physical storage location as identified using the first metadata; and returning the first content, as retrieved from the first physical storage location using the first metadata, in response to the read I/O operation.

19. The non-transitory computer readable medium of claim 18, wherein the first metadata used as the second key to index into the second cache is included in mapping information which maps the target logical address to the first physical storage location including the first content.

* * * * *